United States Patent

Kamada et al.

Patent Number: 6,118,389
Date of Patent: *Sep. 12, 2000

[54] AUTOMOBILE NAVIGATION APPARATUS AND METHOD FOR SETTING DETOURS IN THE SAME

[75] Inventors: Tadashi Kamada, Chita-gun; Takashi Ishizaki, Kariya, both of Japan

[73] Assignee: Nippondenso Co., Ltd., Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/607,773

[22] Filed: Feb. 27, 1996

[30] Foreign Application Priority Data

Feb. 28, 1995 [JP] Japan .................................. 7-039759

[51] Int. Cl.[7] .................................................. G08G 1/123
[52] U.S. Cl. ........................................ 340/995; 701/210
[58] Field of Search .................................. 340/995, 990, 340/988; 364/449.1, 449.2, 449.3, 449.4, 449.5; 701/208, 209, 210, 211, 201

[56] References Cited

U.S. PATENT DOCUMENTS

| | | | |
|---|---|---|---|
| 4,926,336 | 5/1990 | Yamada | 340/995 |
| 5,177,685 | 1/1993 | Davis et al. | 340/988 |
| 5,243,528 | 9/1993 | Lefebvre | 364/449.4 |
| 5,285,391 | 2/1994 | Smith, Jr. et al. | 340/995 |
| 5,291,412 | 3/1994 | Tamai et al. | 340/995 |
| 5,410,485 | 4/1995 | Ichikawa | 340/995 |
| 5,428,545 | 6/1995 | Maegawa et al. | 701/210 |
| 5,550,538 | 8/1996 | Fujii et al. | 340/995 |
| 5,608,635 | 3/1997 | Tamai | 340/990 |
| 5,612,881 | 3/1997 | Moroto et al. | 340/995 |
| 5,652,706 | 7/1997 | Morimoto et al. | 364/449.4 |
| 5,659,476 | 8/1997 | LeFebvre et al. | 364/449.4 |

FOREIGN PATENT DOCUMENTS

| | | |
|---|---|---|
| 62-095423 | 5/1987 | Japan . |
| 2-018488 | 4/1990 | Japan . |
| 2-129800 | 5/1990 | Japan . |
| 6-123635 | 5/1994 | Japan . |
| 6-180796 | 6/1994 | Japan . |
| 6-186049 | 7/1994 | Japan . |
| 6-201389 | 7/1994 | Japan . |

*Primary Examiner*—Brent A. Swarthout
*Attorney, Agent, or Firm*—Pillsbury Madison & Sutro LLP

[57] ABSTRACT

An automobile navigating apparatus capable of setting a detour for a route to a desired destination. A memory device stores link information about links that constitute a map. Based on the link information, a route calculating section sets a route running from a start point to a desired destination by using evaluation values assigned to the links. The route thus set is shown on a display device in a highlighted manner. At the same time, directions to the desired destination along the route are instructed verbally. When a detour switch is operated, a detour for the route is calculated by a detour calculating section. In the detour calculation, the detour calculating section lowers the evaluation value for the link concerned along the previously set route to prevent the same from being set again.

17 Claims, 7 Drawing Sheets

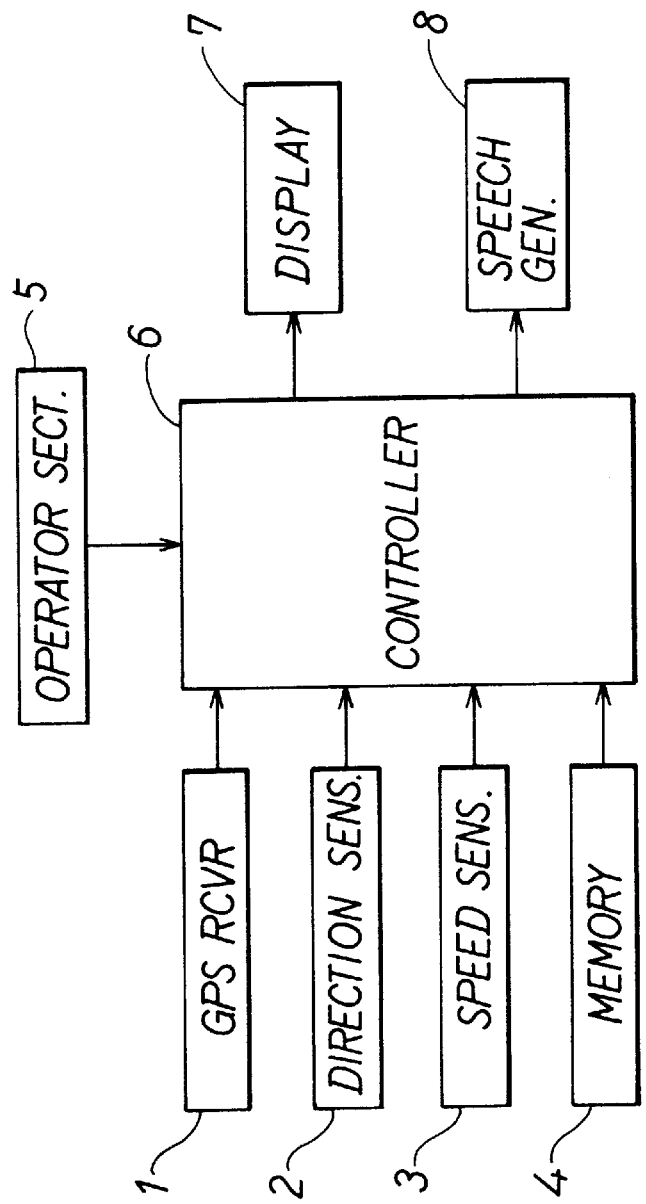

AUTOMOBILE NAVIGATION APPARATUS AND METHOD FOR SETTING DETOURS IN THE SAME

CROSS-REFERENCE TO RELATED APPLICATIONS

This application is related to and claims priority from Japanese Patent Application No. Hei. 7-39759, incorporated herein by reference.

BACKGROUND OF THE INVENTION

1. Field of the Invention

The present invention relates to an automobile navigation apparatus for guiding a driver of an automobile along a route to a desired destination.

2. Description of the Related Art

In conventional automobile navigation apparatuses, a route from a start point to a desired destination is set. The route thus set is displayed in a highlighted manner on a road map shown on a display device or directions in which the automobile will travel are indicated by spoken instructions for navigation.

When driving along a preset route to a desired destination by using such a navigation apparatus, a driver is sometimes required to set a detour in situations such as confronting road construction work and traffic congestion. In the above-mentioned conventional automobile navigation apparatuses, however, once a route to a desired destination has been set, the route cannot be changed while traveling, making the apparatuses less flexible in use.

To solve this problem, Japanese Patent Publication No. 2-18488 discloses an apparatus in which a route calculation is done again if an automobile has gotten out of a preset route to a desired destination, thereby resetting the route again.

However, the disclosed apparatus is for resetting a route to a desired destination only when an automobile has gotten out of a preset route and is not for setting a detour to the desired destination. Therefore, setting a detour by using this apparatus requires a driver to get out of a preset route intentionally. Further, if, in the route resetting, the preset route is determined to be the best, the preset route will be set again.

SUMMARY OF THE INVENTION

It is therefore an object of the present invention to provide an automobile navigation apparatus for setting a detour to a desired destination.

The above object is achieved in a first aspect of the present invention by providing an evaluation value for a link along a route to a desired destination which is lowered on detection of a timing at which a detour is set, thereby newly setting the detour to the desired destination starting from a current position. Lowering the evaluation value for the link in turn lowers the possibility of setting the previously set route again, thus enabling the setting of another route as a detour.

In another aspect of the present invention, this object is achieved by providing a link along a route to a desired destination within a predetermined range which is identified from a current position of an automobile and an evaluation value for the identified link is lowered, thus enabling the setting of a detour not for the entire route to the desired destination but for a part of the route.

The above object is achieved according to a further aspect of the present invention by providing a link that goes by way of at least one of a service area and a parking area which is identified, and an evaluation value for the identified link is lowered, thereby making it difficult to set a route that does not match actual conditions such as going by way of the service area or the parking area.

According to still another aspect of the invention, the object is achieved by, in setting again a route to a desired destination, lowering an evaluation value for a link along a turn-left or turn-right route at an intersection, thereby making it difficult to set a detour that crosses the previously set route in a zigzag manner.

According to yet another aspect of the present invention, whether a current position of an automobile has passed a passing point or not is determined and, if the passing point has been passed, a route from the current position to a desired destination is set again without going by way of the passing point. This prevents the setting of a route that returns to a point that has been already passed.

According to a further aspect of the present invention, link information having layers of a higher map and a plurality of lower maps contained in the higher map are used to reduce an amount of necessary navigation data, thereby shortening a calculation for setting a route. In addition, at the time of setting a route to a desired destination again, the setting is performed by using the link information of one of the lower maps which contains a current position of an automobile, enabling the proper setting of a detour in the vicinity of the current position.

Yet another aspect of the present invention provides a method for a vehicle navigation system which can reliable and accurately set detours as described above.

The above and other objects, features and advantages of the present invention will become more apparent from the accompanying drawings, in which like reference numerals are used to identify the same or similar parts in several views.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a block diagram illustrating an automobile navigation apparatus according to a preferred embodiment of the present invention;

FIG. 2 is a diagram illustrating a constitution of map data according to the embodiment;

DETAILED DESCRIPTION OF THE PRESENTLY PREFERRED EXEMPLARY EMBODIMENTS

Figure 3:
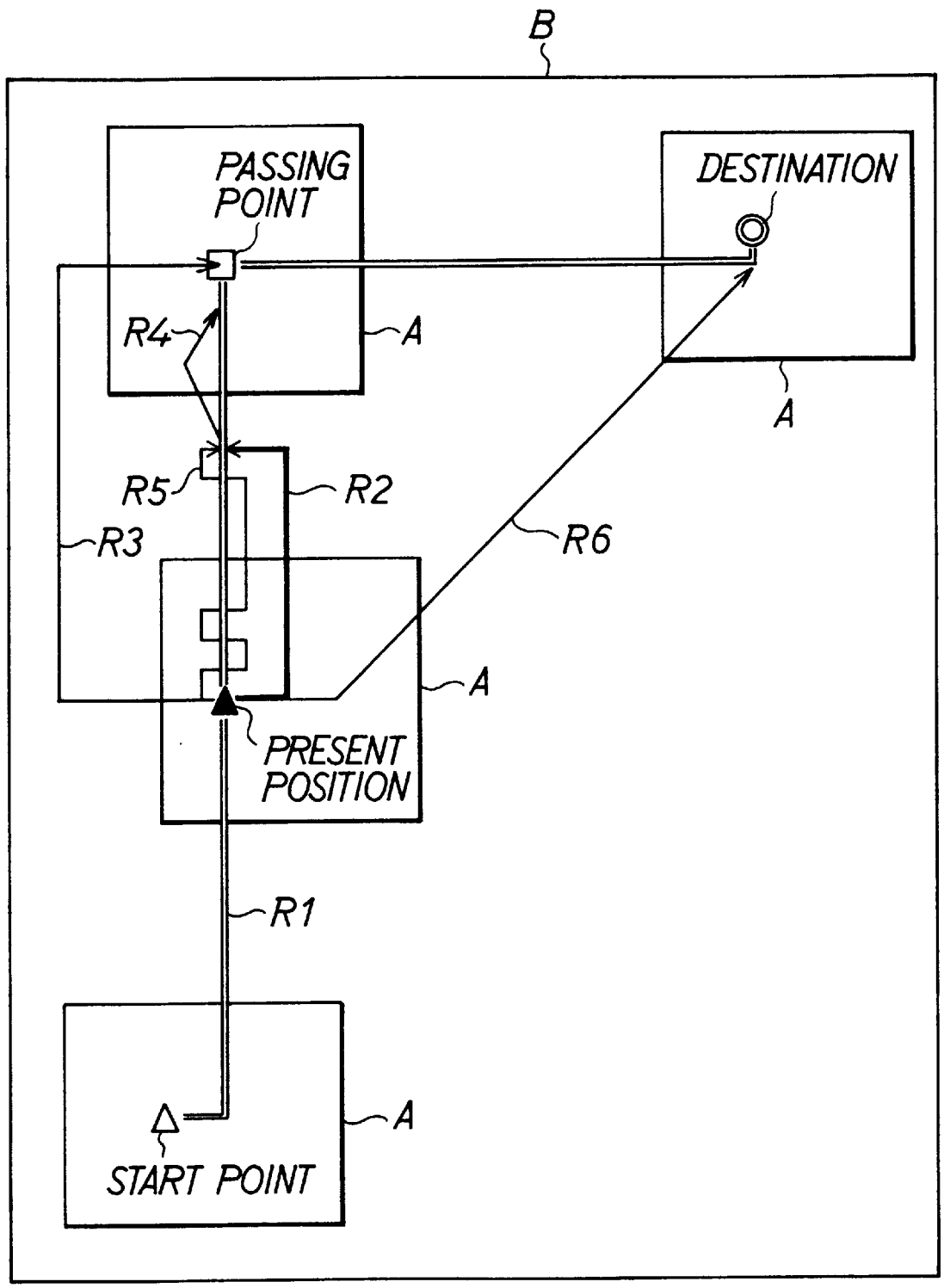
FIG. 3 is a schematic diagram illustrating a relationship between a higher map and lower maps and the setting of a route to a desired destination by using these maps according to the embodiment.

This invention will be described in further detail by way of example with reference to the accompanying drawings.

FIG. 1 shows an overall constitution of an automobile navigation apparatus practiced as one preferred embodiment of the present invention. The present embodiment comprises a GPS (Global Positioning System) receiver 1, a direction sensor 2, and a speed sensor 3 in order to detect a current position of an automobile. The GPS receiver 1 receives data from an artificial satellite to output a signal indicating the current position of the automobile. The direction sensor 2 detects, by using geomagnetism for example, a direction in which the automobile travels and outputs the detected direction. The speed sensor 3 detects a travel distance of the automobile from a rotational speed of a wheel of the automobile to output a distance signal.

A memory device 4 is provided with a storage medium such as a CD-ROM for storing map data and the like which are outputted to a controller 6. The storage medium also stores speech data for generating spoken instructions or guidance.

An operator section 5 is operated by a driver to output operator signals necessary for navigation. The operator section 5 allows the driver to set a desired destination and passing points when setting a route to the destination. For example, the driver can input a desired destination and passing points by specifying a position on a display device 7 or by setting a telephone number of that position. The operator section 5 also has a detour switch to be operated when the driver wants to set a detour.

The controller 6 comprises a computing device such as a microcomputer. Accepting signals coming from the above-mentioned components 1 through 5, the controller 6 causes the display device 7 to display a road map of an area through which the automobile will travel and, at the same time, performs arithmetic operations for displaying the current position of the automobile on the road map. Further, when navigating the automobile to a desired destination, the controller 6 sets a route to the desired destination and causes the display device 7 to display the route in a highlighted manner and, at the same time, performs arithmetic operations for causing a speech generator 8 to generate spoken instructions for navigating the automobile to the desired destination.

The display device 7 is preferably installed on an instrument panel of the automobile to display a road map, a current position, and other information. The display device 7 may be implemented by a liquid crystal display (LCD), an cathode ray tube (CRT) display or the like. Also, the speech generator 8 generates spoken instructions from the signal outputted from the controller 6.

FIG. 2 shows a format of the above-mentioned map data. In the present embodiment, a road on a map is divided by a plurality of nodes such as intersections and an interval between adjacent nodes is defined as a link. The links thus defined are connected to form the map. The map data have data about each link shown in FIG. 2, namely link information.

To be more specific, the link information comprises a number unique to each link (link ID), a length of the link, X and Y coordinates of start and end points of the link, an angle of the link to a predetermined direction (for example, the north), a road width of the link, and a road type of the link (for example, high-speed standard roads such as an expressway and a toll road, opposite lanes separated by a divider, an service area, and a parking area).

Figure 4:
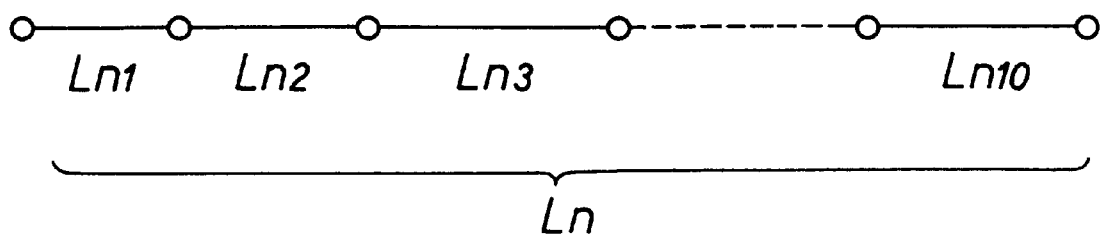
FIG. 4 is a schematic diagram illustrating a relationship between link IDs in the lower and higher maps according to the embodiment.

Also, the map data are formed by a lower map layer and a higher map layer. As shown in FIG. 3, each of the lower maps denoted by "A" represents a road map of a relatively small area, while the higher map denoted by "B" represents a relatively large area that includes the areas represented by the lower maps A. In the case of FIG. 3, the link information of each of the lower maps A is configured to represent more detailed information than that of the higher map B. Namely, referring to FIG. 4, a plurality, e.g., ten, link IDs (Ln1 through Ln10) constitute a lower map for one link ID (Ln) of a higher map.

Figure 5:
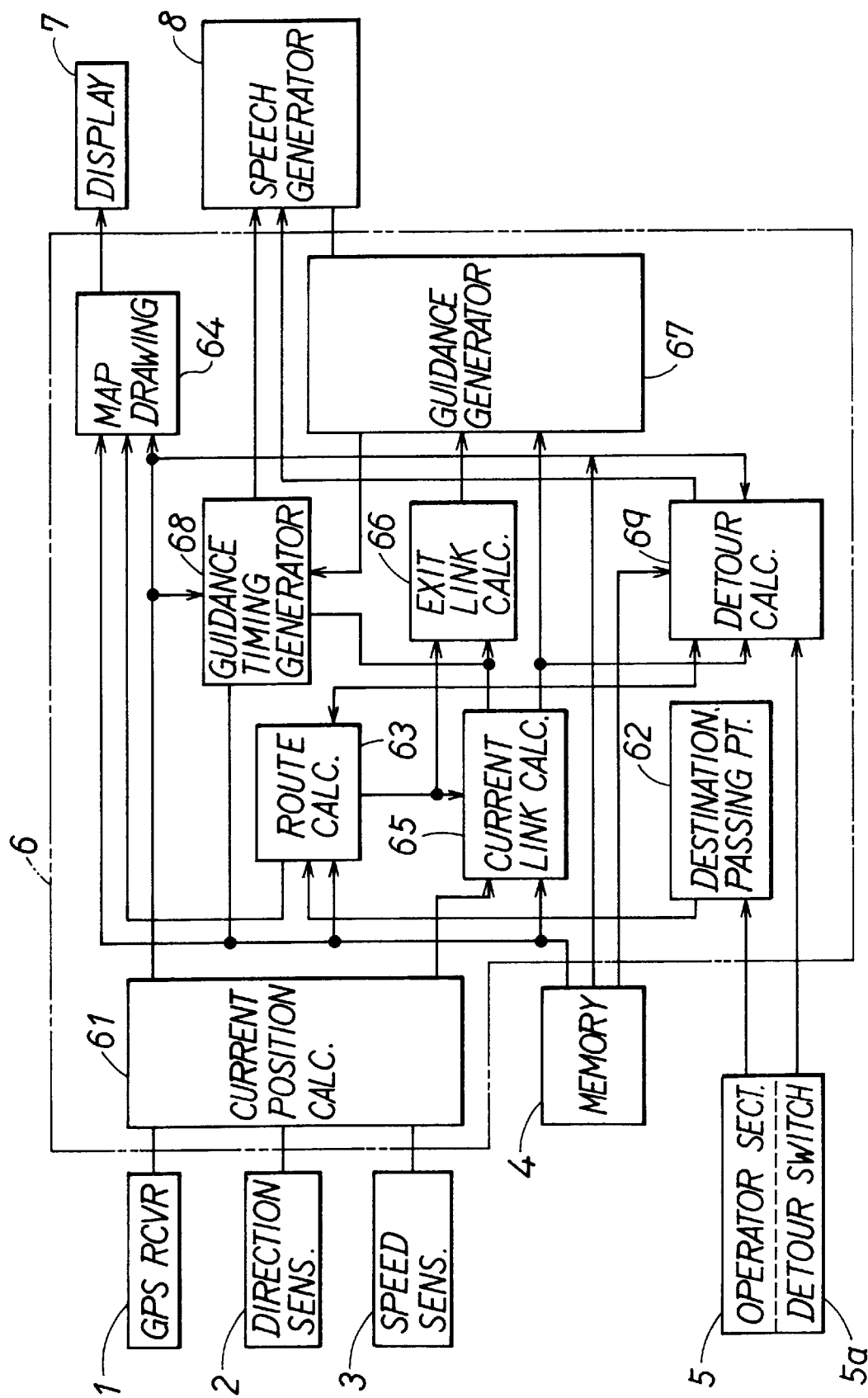
FIG. 5 is a functional block diagram illustrating the embodiment.

FIG. 5 shows a functional block diagram illustrating the embodiment of FIG. 1. A current position calculating section 61 accepts a signal from the GPS receiver 1 indicating a current position of an automobile and, at the same time, accepts a direction signal from the direction sensor 2 and a distance signal from the speed sensor 3 to calculate the current position of the automobile.

When a desired destination or a passing point thereto has been entered on the operator section 5 (specifying a position on the display device 7 or entering a telephone number of that position), a destination and passing point setting section 62 sets the desired destination and the passing point thereto in the form of coordinates based on the entry.

Based on the above-mentioned map data, a route calculating section 63 calculates a route from a start point (the current position at the time when the desired destination is set) to the desired destination via the passing point by means of a cost calculation based on the Dijkstra method, namely an evaluation value calculation based on data such as link length, road type, and road width.

Figure 6:
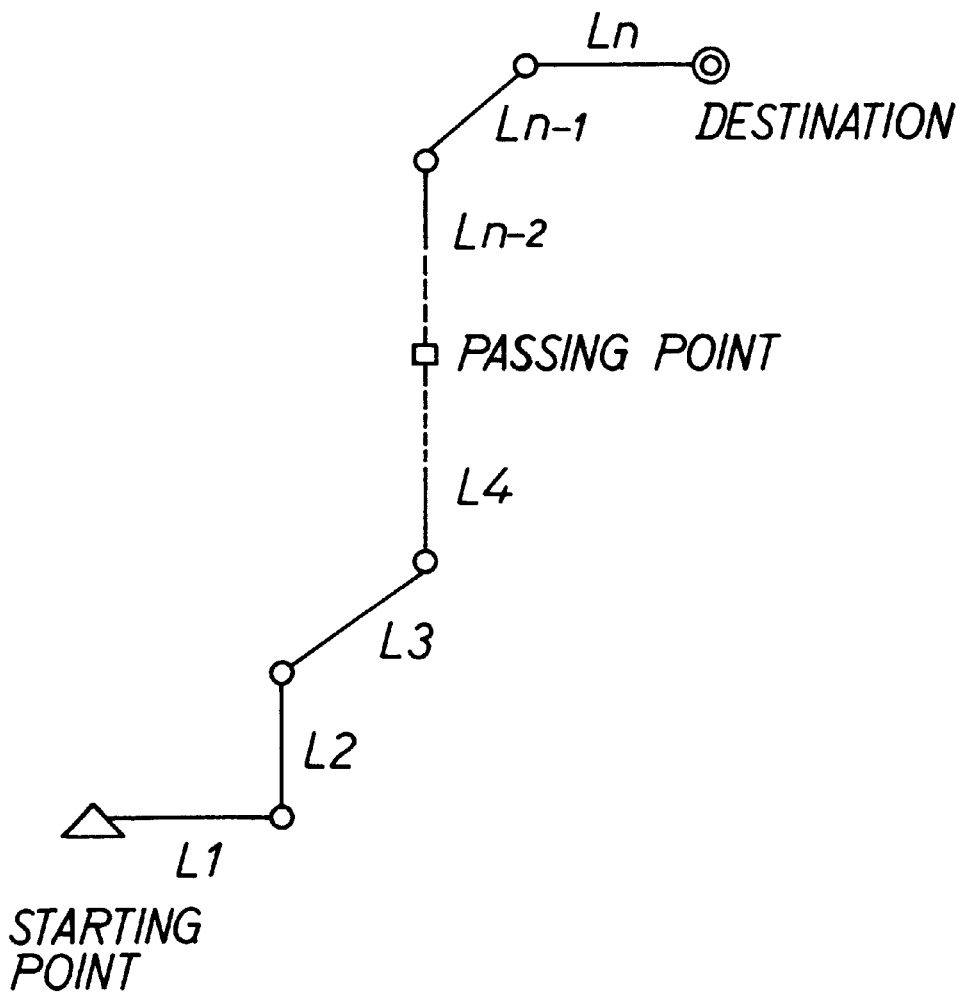
FIG. 6 is a schematic diagram illustrating a string of link IDs along a route to a desired destination according to the embodiment.

In this case, the lower maps of FIG. 3 including the start point, the destination, and the passing point are read from the memory device 4 along with the higher map including the start point and the destination. The maps thus read are stored in a memory section in the controller 6, the memory section being formed by a RAM (Random Access Memory) or the like. Using the stored maps, route segments in the lower maps are set in the lower maps and the route segments in the lower maps are connected using the higher map. Based on the route segment from the start point to the passing point and the route segment from the passing point to the destination, a route to the desired destination is set, the set route being the one having the highest evaluation criteria. The route to the desired destination is identified as a link ID string as shown in FIG. 6.

It should be noted that the passing point that has been set is assumed to be a virtual node based on the X, Y coordinates of the passing point, and a link to be connected to the virtual point is assumed to be a virtual link which is handled as additional map data. Based on this additional data and the map data stored in the above-mentioned memory section 4, the route to the desired destination is set.

In setting the route to the desired destination, a flag is set to a node at which the route turns left or right as determined by an angle between connected links, the flag indicating an intersection for navigation. Consequently, when viewed from a current link, an intersection with a next flag set provides a navigated intersection, a link going toward the navigated intersection being called an entrance link and a link going away from the navigated link being called an exit link.

A map drawing section 64 causes the display device 7 to display, based on the map data of the area through which the automobile travels stored in the memory device 4 and the current position calculated by the current position calculating section 61, a road map of the area through which the automobile will travel. At the same time, the map drawing section 64 causes the display device 7 to display the route to the desired destination calculated by the route calculating section 63 on the road map in a highlighted manner.

A current link calculating section 65 determines on which link the current position calculated by the current position calculating section 61 is located along the route to the desired destination set by the route calculating section 63. That is, the coordinates of the calculated current position are compared with the coordinates of the node of each link string along the route to the desired destination to identify a link at which the current position exists, a link ID of that link being a current link ID.

An exit link calculating section 66 provides an exit link ID that is an ID of a link leaving a navigated intersection with a next flag set along the route to the desired destination when viewed from the current link identified by the current link ID.

Figure 7:
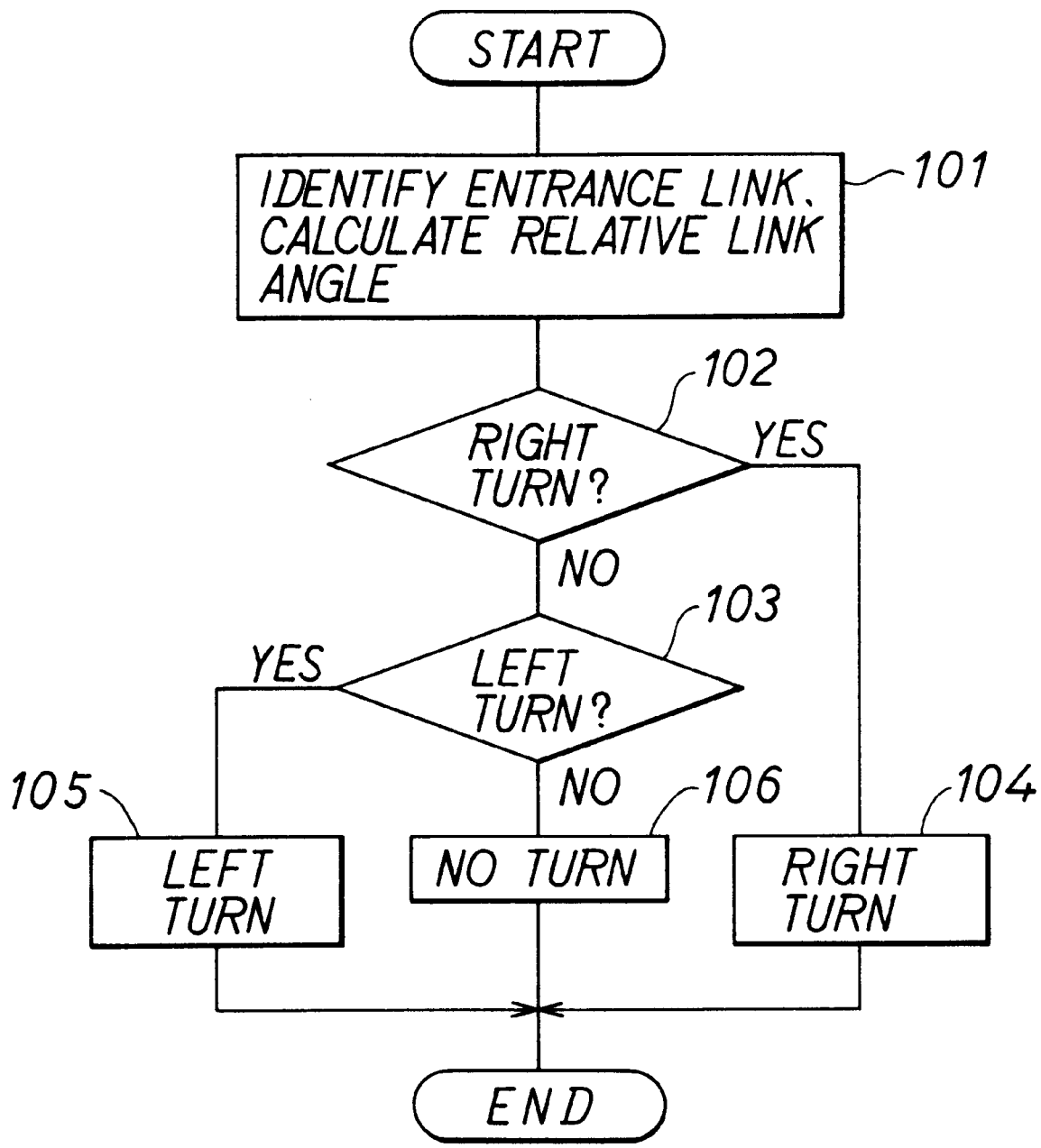
FIG. 7 is a flowchart indicating processing by a guide calculating section in the embodiment.

A guidance generator 67 determines an instruction to be followed by the driver at a next navigated intersection. To be more specific, as shown in the flowchart of FIG. 7, the guidance generator 67 first identifies an entrance link for the next intersection from the current link ID and reads a link angle of the identified entrance link and a link angle of the exit link by the exit link ID calculated as mentioned above to calculate a relative angle between both links (step 101). Then, the guidance generator 67 compares the obtained relative angle with predetermined right-turn and left-turn determination angles (namely, threshold angles) (steps 102 and 103, respectively) and, if the result is found to exceed the threshold angle, determines whether the automobile is to be navigated for right turn or left turn or not to be navigated at all (steps 104, 105, and 106, respectively).

A guidance timing generator 68 determines when to give a spoken instruction at a next navigated intersection. When the guidance time comes, the guidance timing generator 68 causes the speech generator 8 to generate the instruction determined by the guidance generator 67.

Figure 8:
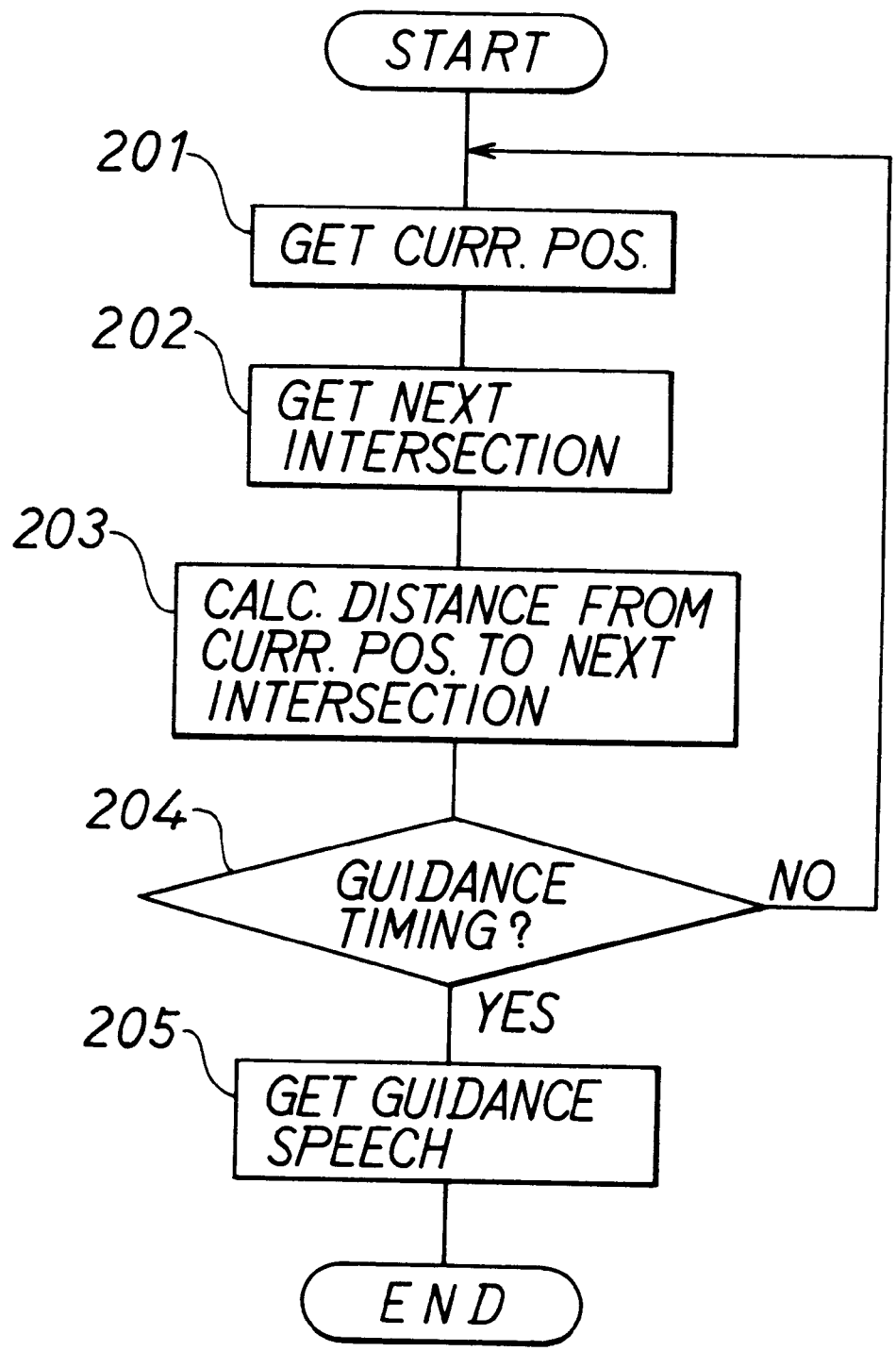
FIG. 8 is a flowchart indicating the processing by a guide timing generator in the embodiment.

That is, as shown in the flowchart of FIG. 8, the guidance timing generator 68 first gets the current position obtained by the current position calculating section 61 and the coordinates of the next navigated intersection (steps 201 and 202). Then, using these coordinates, the guidance timing generator 68 calculates a distance from the current position to the next navigated intersection (step 203).

The guidance timing generator 68 determines a guidance timing when a predetermined distance (for example, 700 meters, 300 meters, or 100 meters) has been reached or the navigated intersection has just been passed (step 204).

On determination of the guidance timing, the guidance timing generator 68 reads speech data for the content of the guidance determined by the guidance generator 67 from the storage medium of the memory device 4 to output the speech data to the speech generator 8 (step 205). According to the speech data, the speech generator 8 gives a spoken instruction to the driver for a left turn or right turn at the next intersection. For, e.g., a right turn, the speech generator 8 generates a spoken instruction "Turn right 300 meters ahead", for example.

According to the above-mentioned constitution, automobile navigation can be performed by indicating a route to a desired destination by visual and aural means.

However, if a route to a desired destination becomes no longer desirable for the driver because the currently set route is blocked for construction work or congested by heavy traffic, for example, the present embodiment can set a detour.

In setting a detour, when the driver operates a detour switch 5*a* provided on the operator section 5, a detour is calculated by a detour calculating section 69 for navigation.

Figure 9:
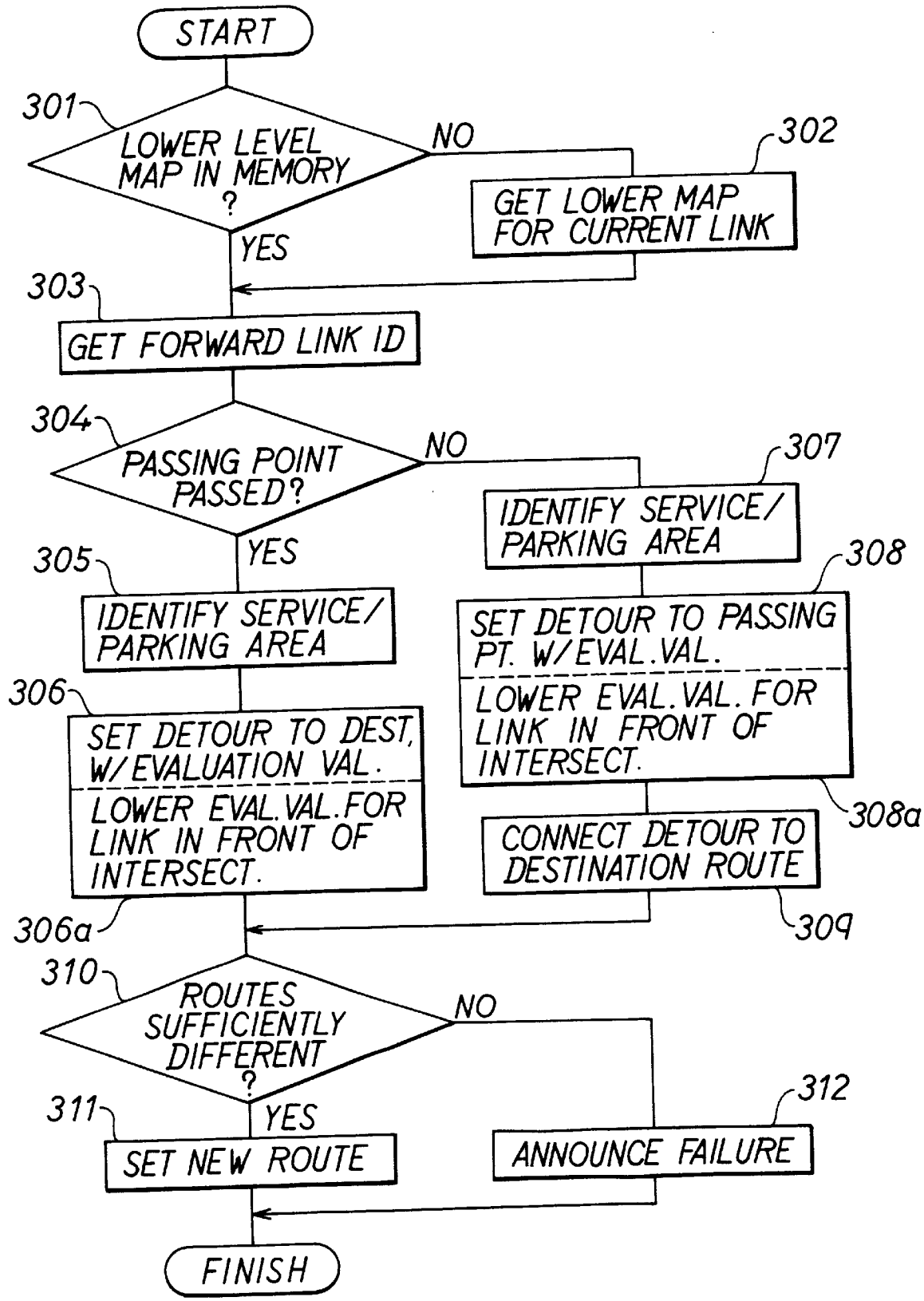
FIG. 9 is a flowchart indicating the processing by a detour calculating section in the embodiment.

Referring to FIG. 9, a flowchart describes the actual processing to be performed by the detour calculating section 69. First, the detour calculating section 69 determines, from the current link ID calculated by the current link calculating section 65, whether a lower map for the current position is stored in the memory section such as the RAM (step 301). This is because the lower map for the current position is required by the setting of a detour as will be described.

In this case, if the current position is relatively near the start position and the lower map including the current position is stored in the memory section, the processing progresses from step 301 to step 303. Conversely, if the current position is not near the start position, the passing position, or the desired destination and the lower map for the current position is not stored in the memory section, the detour calculating section 69 reads the lower map containing the current position by the current link ID (step 302) and then the processing goes to step 303.

In step 303, the detour calculating section 69 obtains a link ID along the route to the desired destination, the link ID belonging to a predetermined forward interval (for example, a predetermined distance, a predetermined number of intersections, a distance up to an intersection first outreaching a predetermined distance, or a distance up to an intersection not outreaching a predetermined distance) by using the current position of the automobile, the current link ID, and the link information of the above-mentioned lower map of the current position.

For example, when identifying a link ID along the route to the desired destination in a range of 10 kilometers ahead, if the route has been identified by a link ID on the higher map, a link ID in the lower map corresponding to the link ID in the higher map is identified, a link length is extracted from the link ID in the lower map, and the link ID along the route in the range of 10 kilometers ahead from the current position is identified. It should be noted that, in this distance calculation, the distance from the current position on the current link to the end point of that current link is obtained by linear calculation using the coordinates of the current position and the end point.

Then, the detour calculating section 69 determines, from the current link ID, whether the passing point along the route to the desired destination has been passed or not (step 304). If the passing point has been passed, the detour calculating section 69 calculates a detour from the current position to the desired destination; if not, the detour calculating section 69 calculates a detour up to the passing point and connects the calculated detour to the route already obtained from the passing point to the destination. This prevents a route for returning to the passing point from being set because the passing point has been passed already.

After passing the passing point, the detour calculating section 69 identifies a service area (SA) and/or a parking area (PA) from the road type in ranges of the lower map for the current position, the lower map for the desired destination, and the higher map including these lower maps to identity a link ID that has the road type of SA/PA (step 305). This identification is made because the link information contains links that run by way of SA/PA and, if such links are incorporated in the detour, the route runs by way of SA/PA, causing a mismatch with an actual situation. It should be noted that the link information contains the links that run by way of SA/PA because SA/PA is set as a passing point or a desired destination.

Then the detour calculating section 69 sets a detour from the current position to the desired destination by an evaluation value calculation based on the Dijkstra method (step 306). In this step, the detour calculating section 69 lowers an evaluation value to be given to a link corresponding to the link ID in the predetermined forward range identified in step 303. Also, the detour calculating section 69 lowers an evaluation value for a link corresponding to the link ID identified as having the SA/PA road type in step 305. In this calculation of the detour to the desired destination, for a route that turns left or right at an intersection, the detour calculating section 69 lowers an evaluation value for the link in front of the intersection (step 306*a*). These detour calculations provide a link ID string of the detour.

It should be noted that it is empirically desirable to lower the evaluation values to about ¼, for example. The lowered evaluation values make it difficult to set as a detour a route segment composed of the links having the lowered evaluation values.

Before passing a passing point, the detour calculating section 69 identifies a link ID having the SA/PA road type in the ranges of the lower map for the current position, the lower map for the passing point, the lower map for the desired destination, and the higher map containing these lower maps (step 307). Then the detour calculating section 69 sets a detour up to the passing point in the same way as in step 306 (steps 308 and 308*a*). The detour calculating section 69 connects that detour to the route to the desired destination already calculated to obtain the link ID string along the route to the desired destination (step 309).

The detour calculating section 69 compares the link ID string of the new route obtained in step 306 or steps 308 and 309 with the link ID string of the route already obtained to find how much both ID strings match each other (step 310). If a degree of the match is lower than a certain level (for example, when the ratio of links that are common to both strings to the total number of links in one of the strings is less than 95% to 100%), the detour calculating section 69 sets the newly set route to the route calculating section 63 (step 311). Consequently, navigation is performed following the route that has been newly set as described above. To be more specific, the route that has been newly set is displayed on the display device 7 in a highlighted manner and spoken instructions formed accordingly are given.

Meanwhile, if the degree of match is found exceeding the certain level in step 310, it is regarded that the detour calculation has failed, which is announced from the speech generator 8 (step 312).

Referring to FIG. 3 again, the new route as mentioned above allows the driver to set a detour R2 for the already set route R1 to the desired destination. That is, lowering the evaluation values to be given to the links in the predetermined forward range lowers the possibility for the route formed by these links to be set as a detour, thereby making it easy for a relatively proper detour such as the R2 detour to be set. In addition, since a route having a relatively high evaluation point is set as a detour, it is impossible for a big detour such as detour R3 to be selected as a detour.

The link that goes by way of SA/PA is also lowered in its evaluation value, making it difficult for a detour that goes by way of SA/PA such as indicated by detour R4 to be set.

Further, a link that turns left or right at an intersection is lowered in its evaluation value, making it difficult for a detour that crosses the previously set route to the desired destination in a zigzag manner to be set as indicated by detour R5.

Before passing the passing point, the route that passes the passing point is set, preventing a route that does not pass the passing point as indicated by detour R6 from being set.

It should be noted that, in the above-mentioned embodiment, each evaluation value is lowered to about ¼; alternatively, the evaluation value of a link may be set to zero to prohibit the setting of a route that passes the link. That is, the lowering of evaluation values as referred to in the claims appended hereto includes the setting of an evaluation value to zero.

In the above-mentioned embodiment, the detour switch 5*a* is operated by the driver for detour setting. It will be apparent to those skilled in the art that the detour setting may be performed automatically upon detection of traffic congestion based on externally-provided information.

In the above-mentioned embodiment, each next intersection is navigated by a spoken instruction. It will be apparent to those skilled in the art that a head-up display may be used to display a turning direction at each navigated intersection on a windshield.

While the preferred embodiment of the present invention has been described using specific terms, such description is for illustrative purposes only, and it is to be understood that changes and variations may be made without departing from the spirit or scope of the appended claims.

For example, the functional block constitution of FIG. 5 and the functional implementing means shown by the steps of FIGS. 7 through 9 can be embodied by logic constitutions other than computer control.

What is claimed is:

1. An automobile navigating apparatus for a vehicle, said apparatus comprising:

map storage means for storing link information of links which form a map;

route setting means for setting a destination route from a starting point to a destination based on said link information, said apparatus performing navigation based on said set destination route;

directing means for directing setting of a detour of said destination route at a user-chosen timing; and route resetting means for resetting said destination route from a present position of a vehicle to said destination during direction of setting of said detour by said directing means, wherein said route resetting means has identifying means for identifying a link along said destination route within a predetermined range from said present position of said vehicle to lower an evaluation value assigned to said identified link.

2. An automobile navigating apparatus according to claim 1, wherein said map storage means stores said link information in layers having a higher map and a plurality of lower maps contained in said higher map, said link information about said plurality of lower maps being more detailed than link information about said higher map, and said route resetting means newly sets said route to said destination by using said link information about said lower map containing said present position of said automobile.

3. An automobile navigating apparatus according to claim 1, wherein said route resetting means sets said detour through computation of link evaluation values using a Dijkstra method.

4. An automobile navigating apparatus according to claim 1, further comprising a voice generator which uses voice instructions for guiding a vehicle into an intersection.

5. An automobile navigating apparatus for a vehicle, said apparatus comprising:

map storage means for storing link information of links which form a map;

route setting means for setting a destination route from a starting point to a destination based on said link information, said apparatus device performing navigation based on said set destination route;

directing means for directing setting of a detour of said destination route at a user-chosen timing; and route resetting means for resetting said destination route from a present position of a vehicle to said destination during direction of setting of said detour by said directing means, wherein said map storage means also stores link information about a link that goes by way of at least one of a service area and a parking area and said route resetting means has link identifying means for identifying a link that goes by way of at least one of said service area and said parking area to lower an evaluation value for said identified link.

6. An automobile navigating apparatus for an automobile, said automobile navigating apparatus comprising:

map storage means for storing link information about links constituting a map;

route setting means for setting a route from a start point to a desired destination by using evaluation values assigned to said links based on said link information to navigate an automobile along said route;

detecting means for detecting a timing at which a detour for said route is set; and route resetting means for newly setting a route from a current position of said automobile to said desired destination by lowering evaluation values for links along said route to said desired destination;

wherein said route resetting means has identifying means for identifying a link along said route within a predetermined range from said current position of said automobile to lower an evaluation value assigned to said identified link; and said map storage means also stores link information about a link that goes by way of at least one of a service area and a parking area and said route resetting means has link identifying means for identifying a link that goes by way of at least one of said service area and said parking area to lower an evaluation value for said identified link.

7. An automobile navigating apparatus according to claim 6, wherein said route resetting means has identifying means for identifying a link along said route within a predetermined range from said current position of said automobile to lower an evaluation value assigned to said identified link.

8. An automobile navigating apparatus according to claim 6, wherein said route resetting means has an evaluation value lowering means for lowering, when resetting said route to said desired destination, an evaluation value for a link along a route that turns left or right at an intersection.

9. An automobile navigating apparatus according to claim 6, wherein said route setting means has a passing point setting means for setting said route from said start point to said desired destination by going by way of a previously set passing point and said route resetting means has determining means for determining whether said current position of said automobile has passed said previously set passing point and, if said previously set passing point has been passed, newly sets a route from said current position to said desired destination without going by way of said previously set passing point.

10. An automobile navigating apparatus according to claim 6, wherein said map storage means stores said link information in layers having a higher map and a plurality of lower maps contained in said higher map, said link information about said plurality of lower maps being more detailed link than link information about said higher map, and said route resetting means newly sets said route to said desired destination by using said link information about said lower map containing said current position of said automobile.

11. A method of setting a detour in a vehicle navigation system using map link information to determine a path of travel for a vehicle, said method comprising the steps of:

determining a first route based on said map link information;

setting said first route as a path of travel;

determining, based on said map link information, a forward point in a forward direction on said first route which satisfies predetermined criteria;

determining that a current point of said vehicle is one of before a passing point and after said passing point;

modifying evaluation criteria associated with map link information in said first route between said current point in said first route and said forward point;

determining a second route by determining a route from said current point to said passing point when said current point is before said passing point, and determining a route from said current point to a destination point when said current point is after said passing point.

12. The method of claim 11, said forward point determining step comprising a step of selecting a point a predetermined distance from said current point.

13. The method of claim 11, said forward point determining step comprising a step of selecting a point a predetermined number of intersections from said current point.

14. The method of claim 11, said forward point determining step comprising a step of selecting a point at an intersection most proximate a predetermined distance from said current point.

15. The method of claim 11, said modifying step comprising a step of lowering evaluation values of points in front of an intersection where said first route turns.

16. A method of setting a detour in a vehicle navigation system using map link information to determine a path of travel for a vehicle, said method comprising the steps of:

determining a first route based on said map link information;

setting said first route as a path of travel;

determining, based on said map link information, a forward point in a forward direction on said first route which satisfies predetermined criteria;

modifying evaluation criteria associated with map link information in said first route between a current position of said vehicle in said first route and said forward point by lowering evaluation values of points identified as one of a service area and a parking area; and determining a second route using said modified evaluation criteria.

17. A method of setting a detour in a vehicle navigation system using map link information to determine a path of travel for a vehicle, said method comprising the steps of:

determining a first route based on said map link information;

setting said first route as a path of travel;

determining, based on said map link information, a forward point in a forward direction on said first route which satisfies predetermined criteria;

modifying evaluation criteria associated with map link information in said first route between a current position of said vehicle in said first route and said forward point; and determining a second route using said modified evaluation criteria;

calculating a degree of similarity of said first and second routes;

setting said second route as said path of travel when said degree of similarity is below a predetermined level; and determining a failure when said degree of similarity is not above said predetermined level.

* * * * *